July 21, 1931.  E. A. TURNER  1,815,814
AUXILIARY EXTENSIBLE WING FOR AIRPLANES
Filed June 10, 1930  2 Sheets-Sheet 1
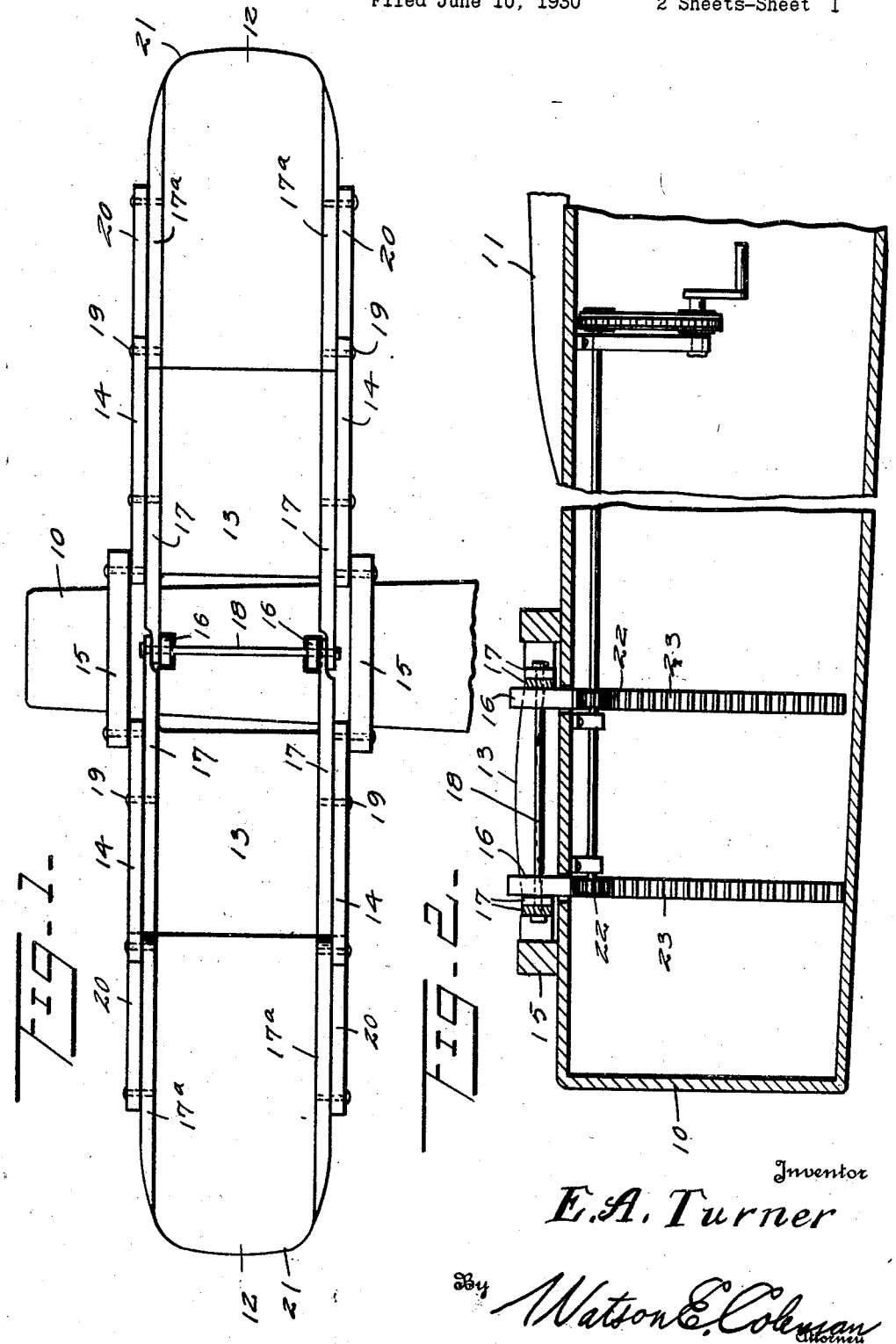
Inventor
E. A. Turner
By Watson E. Coleman
Attorney

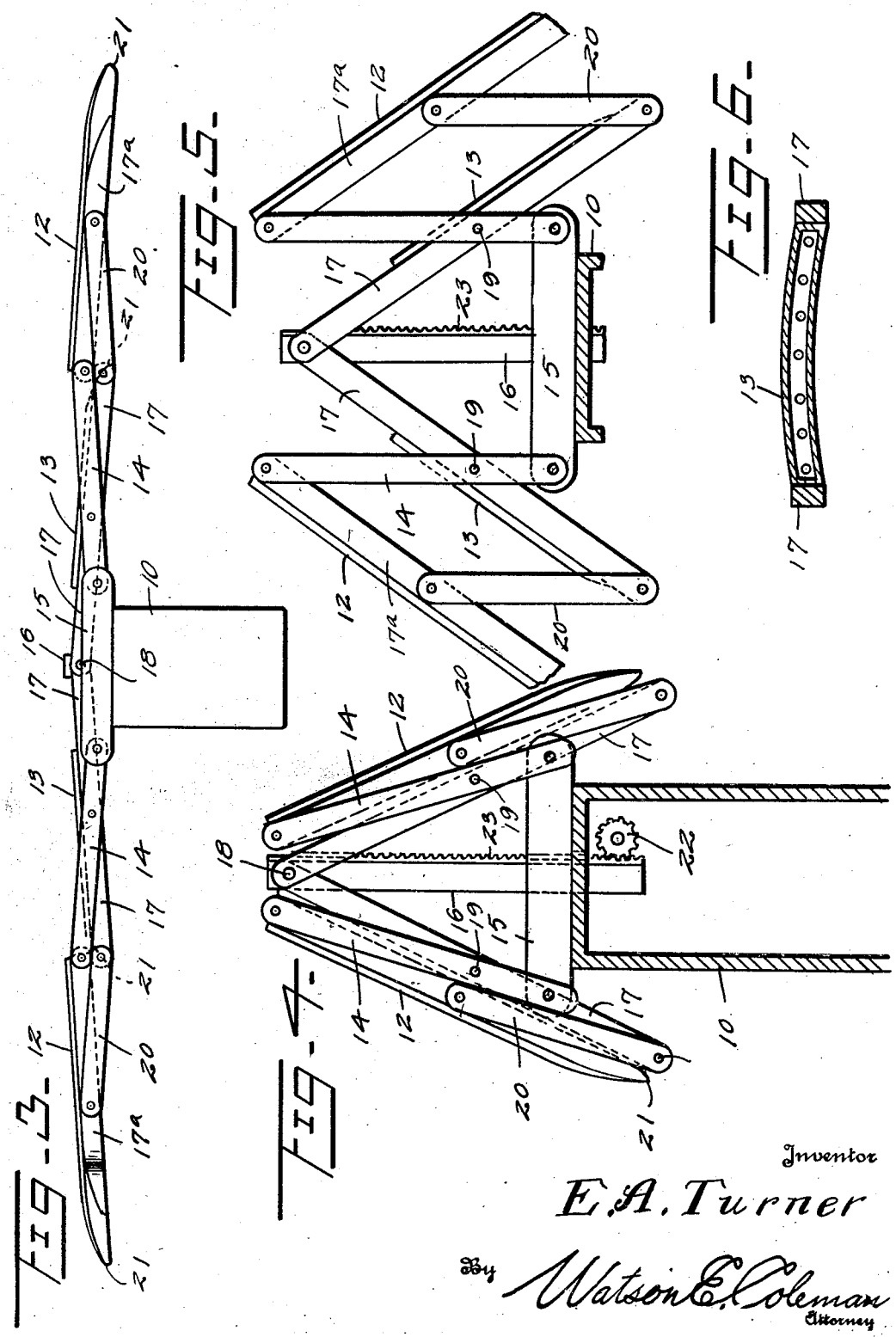

Patented July 21, 1931

1,815,814

UNITED STATES PATENT OFFICE

ELDON A. TURNER, OF GRANITEVILLE, MASSACHUSETTS

AUXILIARY EXTENSIBLE WING FOR AIRPLANES

Application filed June 10, 1930. Serial No. 460,224.

This invention relates to airplanes and particularly to auxiliary wings and the general object of the invention is to provide an airplane with an auxiliary wing which is normally contracted or folded when out of use but which may be expanded or projected into a position for use at the will of the pilot.

A further object is to provide an auxiliary wing of this kind mounted upon the fuselage and embodying a plurality of wing sections, which when unfolded provide a laterally projecting wing structure which may be used particularly in making forced landings or when the engine is stopped and it is desired to allow the machine to come to earth gently and to increase the supporting wing surface.

Other objects have to do with the details of construction and arrangement of parts as will appear more fully hereinafter.

My invention is illustrated in the accompanying drawings, wherein:—

Figure 1 is a top plan view of the rear portion of an airplane fuselage showing my invention applied thereto;

Figure 2 is a vertical section on a median line of the fuselage showing the means for operating the extensible auxiliary wings;

Figure 3 is a rear elevation of the fuselage showing the extensible wings spread or extended;

Figure 4 is a sectional view through the fuselage showing the wings contracted;

Figure 5 is a fragmentary end elevation showing the wings partly extended, and

Figure 6 is a cross section through one of the sections of the wings.

Referring to these drawings, 10 designates the fuselage which is constructed in any usual or suitable manner and which is provided with the usual plane 11 adjacent its nose. The plane is, of course, provided with the usual propelling means and steering and control means.

Mounted upon the fuselage at any desired point rearward of the usual plane 11 is an auxiliary plane consisting of relative wing sections so mounted that they may be folded up in compact form to offer as little air resistance as possible but which shall be adapted to be unfolded and laterally projected at the will of the pilot. I have illustrated to this end a wing consisting of four sections, although I wish it understood that a greater number or less number of sections might be used. The outermost sections of the wing are designated 12 and the innermost sections 13. The outermost sections 12 at their inner ends are pivotally connected to links 14 which in turn are pivotally connected to the fuselage in any suitable manner. I have illustrated these links 14 as being pivotally connected to transverse members 15 mounted upon the top of the fuselage but I do not wish to be limited to this.

Extending upward through the top of the fuselage are two vertically movable posts 16 and the rear ends of the lateral members 17 of the inner sections 13 are pivotally connected to these posts 16 by pivots 18. The links 14 are also pivotally connected to the sections 13, as at 19. Pivotally connecting the outer ends of the sections 13 to the intermediate portions of the sections 12 are the links 20. The posts 16 are supported within the fuselage for vertical movement and any suitable means may be provided whereby the pilot can vertically shift these supporting posts. When the supporting posts 16 are moved upward to the full extent, the wings 12 and 13 will fold upon each other and will take such position that the wings are extended downward and outward on each side of the fuselage. When, however, the posts 16 are drawn downward to their full extent, the lazy-tongs action of the links 14 and 20 and the members 17 which are directly connected to the posts will cause the sections 12 and 13 to move in the position shown in Figure 3 and outwardly project so as to afford an auxiliary supporting surface for the machine. It will be seen that when the auxiliary wings are projected, the sections 12 and 13 will be disposed at a slight inclination downward and outward and that the rear end of the sections 12 will slightly overlap and be superposed over the outer end of the section 13. Preferably, each of these sections 12 and 13 has a convex upper face and a camber or concave under face so as to secure as fully as possible under the circumstances the aspect of the usual plane. Preferably the outer extremities of the sections 12 and 13 will be beveled or thinned downward to a relatively sharp curved edge 21.

I do not wish to be limited, however, to the particular detail construction of these auxiliary wings or planes. They may be made of any suitable material such as the usual material from which the wings are made and will be supported by the longitudinal frames 17 and 17$^a$ and by transverse braces or trusses such as are usually found in airplane wings.

This extensible auxiliary wing may be utilized at any time to provide additional supporting surfaces for the plane but is particularly intended for use when the engine has gone dead and it is desired to make a landing as gently as possible, in which case the auxiliary plane or wing may be extended to thus increase the supporting surface and thus operate in the manner of a parachute. By the use of this auxiliary plane or wing, a tail spin or a nose spin may be prevented. Many different means may be used for raising or lowering the posts 16. I have illustrated for this purpose, however, a longitudinally extending shaft extending through the fuselage and having at one end means whereby the pilot may actuate the shaft and at the other end having gear wheels 22 for engagement with the racks 23 formed upon the posts. This is purely illustrative, as any other desirable means might be used for this purpose which would effect the raising and lowering of the posts at the will of the pilot.

While I have heretofore referred to the fact that the auxiliary wing may be fully contracted or fully expanded, it will be understood that the pilot may, if he so desires, only partially expand or extend the auxiliary wings. Under these circumstances, the wing sections will take an intermediate position with the wing sections extended downward and laterally in parallel relation to each other but spaced from each other. Under these circumstances, the auxiliary wings will offer a much less resistance to the downward movement of the machine than they would, of course, if the auxiliary wings are fully extended in which case the wings are disposed nearly in alinement with each other, the inner ends of the outer wings overlapping and being only slightly spaced from the outer ends of the inner wings. This means the pilot can, to a degree, control the descent of the machine or control the extension of the wings so as to vary the rate of descent.

Having described my invention, what I claim is:—

1. In an airplane having a fuselage, auxiliary wings, each wing including two sections, the inner section of each wing being mounted on the fuselage for vertical movement, links pivotally connected to the inner ends of the outer sections and pivotally connected to the fuselage, said links being pivoted to the inner section intermediate its ends, links pivotally connected to the outer ends of the inner section and to the outer section, and manually controllable means whereby the inner ends of the inner sections may be vertically shifted to thereby contract or extend said wings.

2. The combination with an airplane fuselage, of a series of wing sections, means connected to the fuselage and the wing sections for supporting the wing sections for shifting movement from a position where the wing sections are in upwardly and inwardly inclined planes and in approximate contact with each other to a position where the wing sections are disposed each in an approximately horizontal plane with the wing sections disposed one beyond the other and in approximate alinement, and manually controlled means for shifting the sections from one to the other of such positions.

In testimony whereof I hereunto affix my signature.

ELDON A. TURNER.